United States Patent [19]

Tsuji

[11] Patent Number: 4,965,855

[45] Date of Patent: Oct. 23, 1990

[54] AUTOMOBILE SHAPED MINIATURE RADIO SET

[75] Inventor: Shintaro Tsuji, Tokyo, Japan

[73] Assignee: Sanrio Company, Ltd., Tokyo, Japan

[21] Appl. No.: 265,214

[22] Filed: Oct. 27, 1988

[30] Foreign Application Priority Data

Oct. 27, 1987 [JP] Japan .......................... 62-163942[U]

[51] Int. Cl.[5] .......................... H04B 1/06; H04B 1/08

[52] U.S. Cl. .................................... 455/344; 455/347; 446/485

[58] Field of Search ................................ 455/344–347; 446/129, 137, 139, 297, 298, 299–303, 485–487, 484; 368/45

[56] References Cited

U.S. PATENT DOCUMENTS 4,184,119 1/1980 Kerruish ............................ 455/344

4,579,540 4/1986 Ho ...................................... 455/344

*Primary Examiner*—Reinhard J. Eisenzopf
*Assistant Examiner*—Curtis Kuntz
*Attorney, Agent, or Firm*—Owen, Wickersham & Erickson

[57] ABSTRACT

A model device that looks like a racing car. There are front and rear axles and wheels thereon, a central portion, between the front and rear axles, a hinged nose-like front portion extending forward of the front axle that can be swung open to disclose a cavity, and a rear portion forward of the rear wheels. A radio set is in said central portion and has an on-off and volume control dial on one side and a tuning dial on the other side. The dials are on an upper portion of the central portion thereof. The central portion also has a bottom cover with a detachable portion leading into a bottom cavity. There is a reading light inside the cavity of the nose-like portion and pivotally attached to the nose-like portion. A rearmost portion is detachably secured to the rear portion. There is a digital clock in the rearmost portion which has a hinged cover thereon normally covering the digital clock but able to be swung open. The rear portion also has a cover portion hinged at a forward point thereof that can be swung open to reveal a rear cavity. There is also a detachable antenna rod extending vertically up from the central portion even with part of the rear portion.

7 Claims, 2 Drawing Sheets

FIG. 4
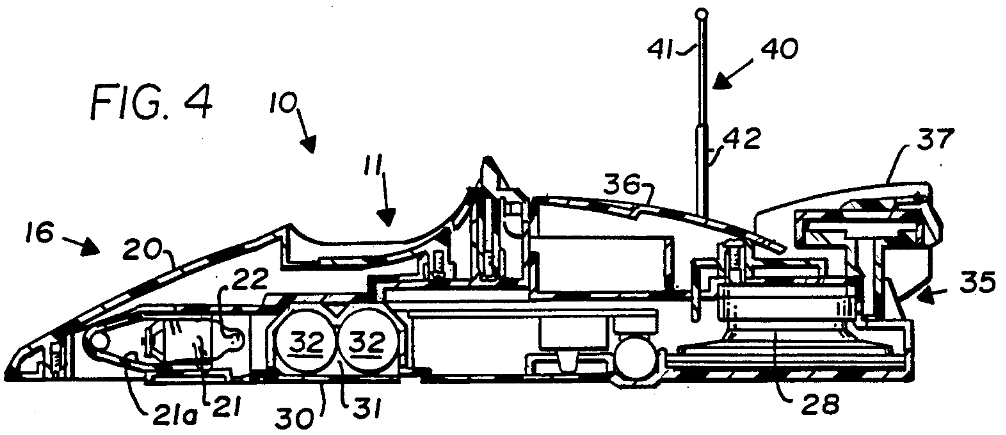
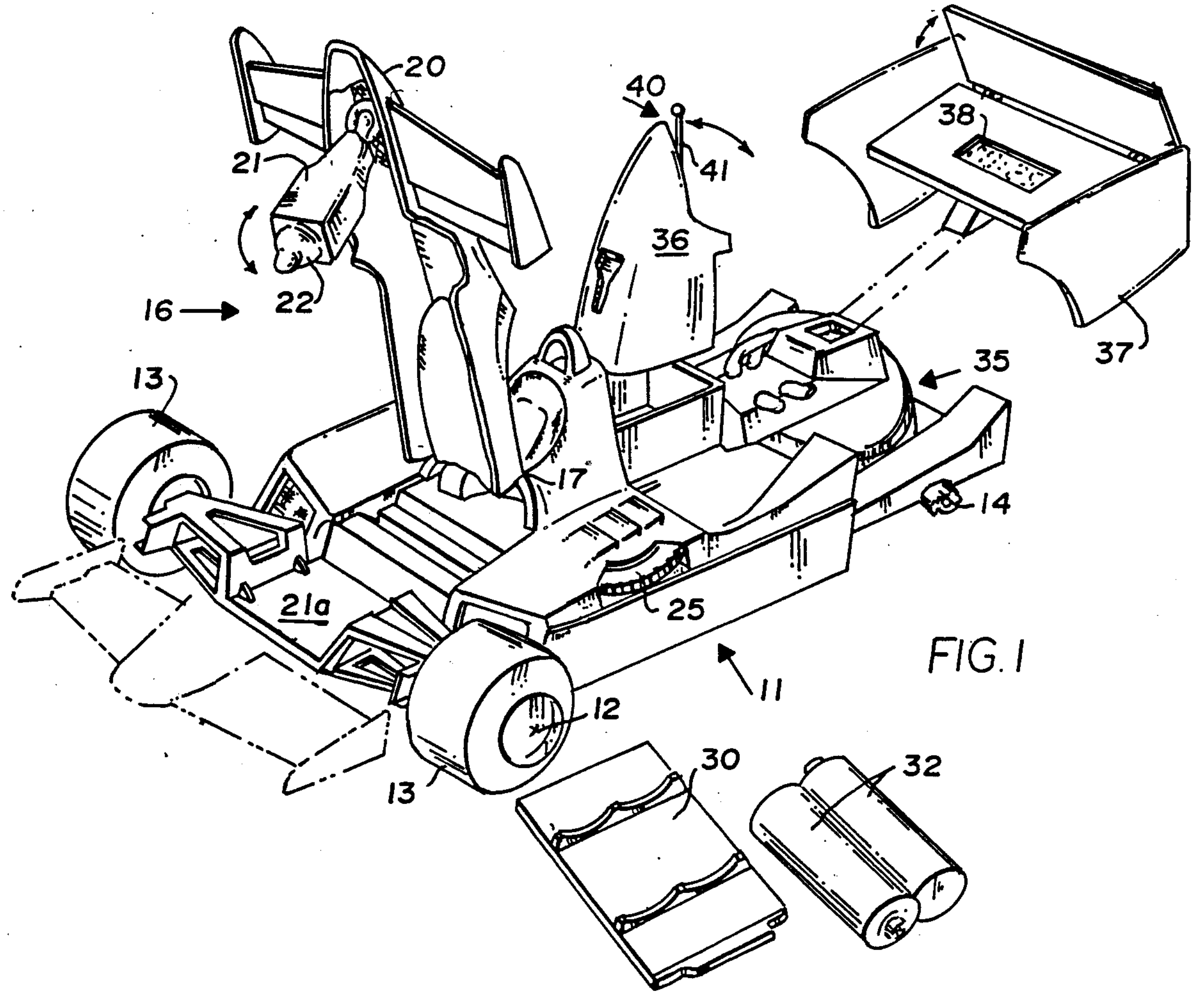
FIG. 1

AUTOMOBILE SHAPED MINIATURE RADIO SET

This invention relates to an automobile-shaped miniature radio set, including a reading lamp and a digital watch.

SUMMARY OF THE INVENTION

The invention endeavors to provide an attractive and pleasing radio set that does not look like an ordinary radio and performs functions also not performed by an ordinary radio. When not used as a radio, the device looks a great deal like a model of a racing car.

BRIEF DESCRIPTION OF THE DRAWINGS

FIG. 1 is a partially exploded perspective view of the radio set viewed from the front and with the reading lamp portion shown in solid lines in the open position, and shown in broken lines in closed position. Also, the rear-end portion is shown detached. This detached portion acts as a digital watch, either attached or detached. Also shown detached are the batteries and a portion of the battery receptacle.

FIG. 4 is a view in longitudinal section corresponding to FIG. 2, but showing portions of the device in vertical section, along the line 4—4 in FIG. 3.

BRIEF DESCRIPTION SOME PREFERRED EMBODIMENTS

Figure 3:
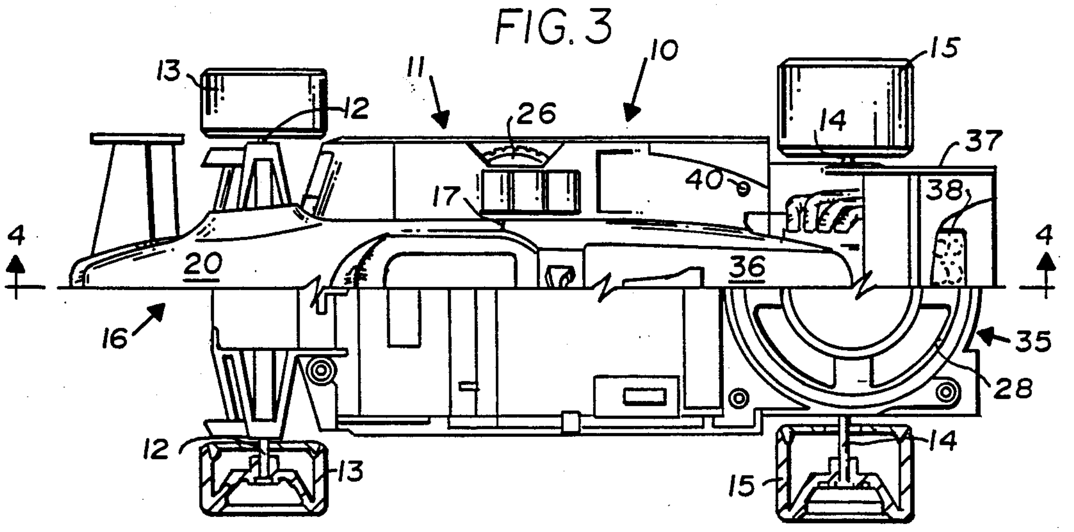
FIG. 3 is a divided sectional view. At the upper end is a plan view taken along the line 3—3 in FIG. 2, and the lower portion of this view is a view in section taken along the line X—X in FIG. 2.
Figure 2:
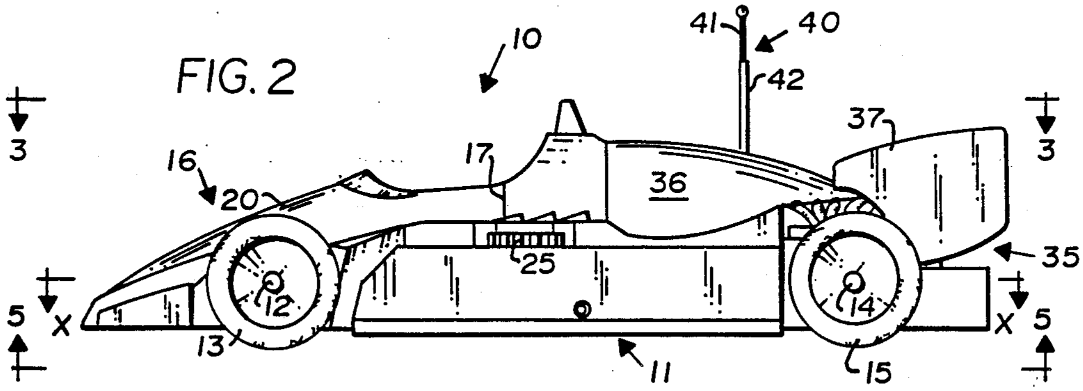
FIG. 2 is a view of the radio set in side elevation.

The device 10 as a whole, as shown in FIGS. 1 and 2, looks like a racing car. There is a central portion 11, which houses the radio set itself. This central portion lies between a front axle 12 having a pair of front wheels 13 on its opposite ends, and a rear axle 14 having a pair of rear wheels 15 on its opposite ends. Being a racing car model, the rotatable wheels 14 and 16 are outside of the side from the main body, as can be seen best in FIGS. 1 and 3. A forward nose-like portion 16 is hinged at a hinge 17, as shown best in FIG. 1.

A hood proper 20 opens up to reveal a hood cavity 21*a* (FIG. 1), and the nose-like portion 16 that swings up also includes a pivoted member 21 holding a light bulb 22, which can be pivoted out as shown in FIG. 1; so that the device 10 can itself be used as a reading lamp.

Figure 5:
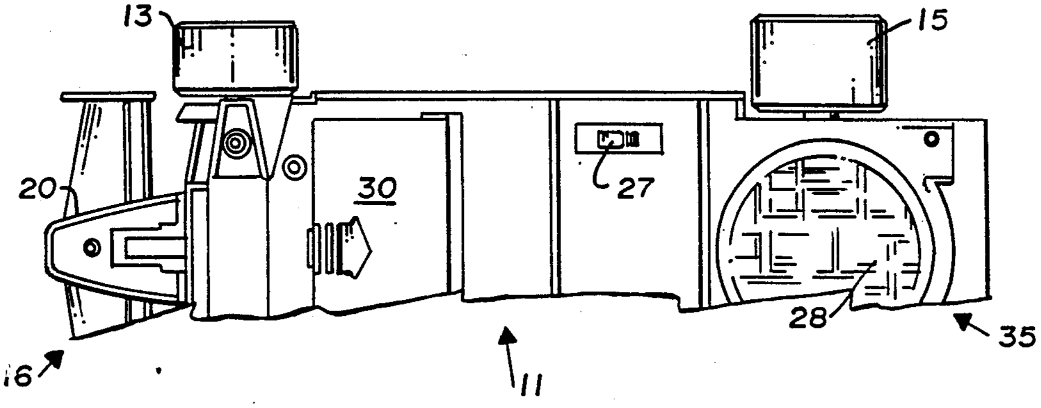
FIG. 5 is a fragmentary bottom view of the radio set looking along the line 5—5 in FIG. 2.

The radio set itself, in the center portion 11 of the body, has a dial 25 for turning it on and off and for volume, and another dial 26 (FIG. 3) on the opposite side of the "car" for tuning. On the bottom of the vehicle 10, as shown best in FIG. 5, is a switch 27 which switches back and forth from the FM to the AM mode of operation of the radio. Also on the bottom, is the speaker portion 28, which projects the sound down toward the floor or table.

Also, on the bottom, toward the front, is a cover member 30 which opens to a cavity 31 accepting batteries 32, of which two AA batteries are normally used. The cavity 31 may be formed to define and show in which direction the batteries 32 are to be mounted. Thus, the radio functions without interfering with and without the help of the front and rear portions 16 and 35 of the vehicle, and without disclosing just what is going on. The tuning dial 26 and volume dial 25 do not appear to be dials and look like a part of the racing vehicle.

At the rear portion 35 of the vehicle is a portion 36, which can be pivoted upwardly as shown in FIG. 1 over a cavity which serves to allow space for miscellaneous material. A rearmost portion 37 of the vehicle 10 is a detachable member which can function to support a digital clock 38 or watch at that point.

The rear portion 35 on one end of the central portion 11 also has threaded to it a vertical antenna rod 40, which may comprise two telescoping portions 41 and 42.

To those skilled in the art to which this invention relates, many changes in construction and widely differing embodiments and applications of the invention will suggest themselves without departing from the spirit and scope of the invention. The disclosures and the descriptions herein are purely illustrative and are not intended to be in any sense limiting.

What is claimed is:

1. A model device that looks like a racing car, said device comprising:

front and rear axles and wheels thereon, a central portion, between said front and rear axles, a hinged nose-like front portion extending forward of said front axle that can be swung open to disclose a cavity, and a rear portion forward of said rear wheels, a radio set in said central portion having an on-off and volume control dial on one side and a tuning dial on the other side, said central portion having said dials on an upper portion thereof, said central portion also having a bottom cover with a detachable portion leading into a bottom cavity, a reading light inside the cavity of said nose-like portion and pivotally attached to said nose-like portion, and a rearmost portion detachably secured to said rear portion.

2. The device of claim 1 having a digital clock in said rearmost portion, said rearmost portion having a hinged cover thereon normally covering said digital clock but able to be swung open to disclose said digital clock.

3. The device of claim 1 wherein said rear portion has a cover portion hinged at a forward point thereof that can be swung open to reveal a rear cavity.

4. The device of claim 1 having a detachable antenna rod extending vertically up from said central portion even with part of said rear portion.

5. A model device that looks like a racing car, said device comprising:

front and rear axle and wheels thereon, a central portion between said front and rear axles, a hinged nose-like front portion extending forward of said front axle that can be swung open at a rear end point thereof to disclose a front cavity, and a rear swingable portion having a pivot at its forward end connecting it swingably to said central portion, with a cavity therebeneath, a radio set in said central portion having an on-off and volume control dial on one side of said central portion and a tuning dial on the other side of said central portion, said central portion having said dials on an upper portion thereof, said central portion also having therebeneath a bottom cover with a detachable portion leading into a bottom cavity, a reading light inside said front cavity pivotally attached to said nose-like portion, and a rearmost portion detachably secured to said rear portion and having a cavity with a cover over it and a digital clock therein.

6. The device of claim 5 having a detachable antenna rod extending vertically up from said central portion even with part of said rear portion.

7. The device of claim 5 wherein said nose-like portion and said rear portion pivot along closely adjacent locations.

* * * * *